United States Patent [19]
Hitchins et al.

[11] Patent Number: 5,511,514
[45] Date of Patent: Apr. 30, 1996

[54] METHOD OF CULTIVATING SHELLFISH

[76] Inventors: Michael W. Hitchins, 12 Brook Street, Blenheim; Hamish T. Jamieson, Clova Bay, RD 2, Picton; Bruce J. Hearn, 59 Holdsworth Street, Blenheim, all of New Zealand

[21] Appl. No.: 290,799
[22] PCT Filed: Feb. 18, 1993
[86] PCT No.: PCT/NZ93/00006
   § 371 Date: Oct. 31, 1994
   § 102(e) Date: Oct. 31, 1994
[87] PCT Pub. No.: WO93/16587
   PCT Pub. Date: Sep. 2, 1993

[30]   Foreign Application Priority Data

Feb. 18, 1992 [NZ] New Zealand .............. 241646

[51] Int. Cl.⁶ ............................................. A01K 61/00
[52] U.S. Cl. ........................ 119/237; 119/238; 119/241
[58] Field of Search ................................ 119/234, 238, 119/239, 240, 237, 241

[56]          References Cited
         U.S. PATENT DOCUMENTS 3,811,411  5/1974  Moeller ..................... 119/240

FOREIGN PATENT DOCUMENTS

| 2315227 | 1/1977 | France . | |
|---|---|---|---|
| 2554319 | 5/1985 | France . | |
| 2559643 | 8/1985 | France | 119/234 |
| 2636206 | 3/1990 | France . | |
| 88/03753 | 6/1988 | WIPO | 119/237 |

*Primary Examiner*—Todd E. Manahan
*Attorney, Agent, or Firm*—Harness, Dickey & Pierce

[57]          ABSTRACT

The invention relates to the cultivation of shellfish. A first type of shellfish capable of securing themselves to a cultch such as by producing byssus are seeded onto a culture rope together with a second type of shellfish which are not capable of securing themselves. The seeding process is carried out using a seeding machine, and the shellfish are retained against the culture rope by way of a seeding stocking. The seeding stocking, the culture rope, and all of the shellfish, are then transferred to a suitable environment for cultivation. The first type of shellfish produce byssus and thereby secure themselves to the culture rope. The second type of shellfish are also secured by way of the byssus produced by the first type of shellfish. The seeding stocking is then no longer required and degrades or is burst by both types of the shellfish.

12 Claims, 1 Drawing Sheet

METHOD OF CULTIVATING SHELLFISH

TECHNICAL FIELD

This invention relates to the cultivation of shell fish, particularly shellfish such as scallops, oysters or the like which do not naturally produce means for securing themselves indefinitely to a suitable cultivation support means, and also shellfish such as mussels which do naturally produce means for indefinitely securing themselves to a suitable cultivation support means.

The term securement means as used herein should be interpreted as a means which is produced by a shellfish and is suitable for enabling the shellfish to be indefinitely and reliably secured to a cultivation support means for cultivation purposes. The term should not be interpreted to mean for example the cement gland of an oyster.

The term retaining means as used herein should be interpreted as a means suitable for retaining shellfish to a cultivation support means for a limited amount of time, whereby the retaining means is capable of being burst by the growing shellfish or is capable of degrading over time such that it is at least substantially wasted by the time the shellfish are of a harvestable size.

BACKGROUND ART

Various methods for the cultivation of scallops, oysters and other like shellfish are known in the art; see for example the disclosures of New Zealand Patent Specifications 164532, 165145 and 207152. Broadly speaking, these methods may be divided into two distinct groups, namely, those in which the shellfish are distributed loosely in baskets, cages, mesh floored trays or the like, and those in which each shell fish is secured to a suitable cultivation support means such as, for example, a culture rope or tarred stick. In conventional scallop or oyster farming, where the second of these cultivation methods is used, artificial retaining devices, such as plastic or metal pins, monofilament nylon, metal rings or chemical adhesive must be used to secure the growing shellfish to the culture rope or the like.

It will be appreciated that there are significant disadvantages inherent in each of the two above mentioned broadly stated methods of shellfish cultivation. Briefly, among the more obvious disadvantages is the high cost of equipment and/or labour in setting up and maintaining a shellfish farm which relies on any of these known methods of cultivation. For example, where the shellfish are loosely distributed in baskets or the like the capital outlay for equipment is high and the equipment requires on-going maintenance, further, the shellfish require frequent manual servicing in the form of respreading and removal of marine fouling organisms etc. While the capital cost of equipment may be lower for farms cultivating shellfish where the shellfish are secured to cultivation support means high labour costs are incurred in setting up the farming operation as each shellfish must be individually secured to the culture rope or the like.

DISCLOSURE OF INVENTION

Accordingly, in a first broad aspect of the present invention there is provided a method of cultivating shellfish, wherein the improvement comprises retaining a plurality of live juvenile shellfish on a cultivation support means by way of a retaining means, said plurality of shellfish comprising a first type of shellfish having the potential for producing securement means at a future date such that said first type of shellfish can become secured to said support means by said securement means, said plurality of shellfish also comprising a second type of shellfish not having the potential for producing securement means, wherein said second type of shellfish can become secured to said support means by way of said securement means when said securement means has been produced by said first type of shellfish.

In a further embodiment of the invention there is provided a method according to the immediately preceding paragraph wherein said plurality of shellfish are placed in a suitable cultivation medium after said plurality of shellfish have been retained in said support means by said retaining means, and said plurality of shellfish are allowed to grow such that securement means is produced by said first type of shellfish wherein the securement means secures said first type of shellfish to said support means.

In a further embodiment of the invention there is provided a method in accordance with any one of the two immediately preceding paragraphs wherein said securement means is allowed to become secured to said second type of shellfish after said securement means has been produced by said first type of shellfish.

In a further embodiment of the invention there is provided a method in accordance, with any one of the three immediately preceding paragraphs wherein said retaining means is allowed to become at least substantially wasted after said second type of shellfish becomes secured to said securement means.

According to a further aspect of the invention there is provided a plurality of shellfish prepared in accordance with any one of the four immediately preceding paragraphs.

In a preferred embodiment of the present invention juvenile mussels are combined with other juvenile shellfish such as scallops, oysters or the like which do not naturally produce means for securing themselves to a suitable cultivation means and/or rock oysters or other such shellfish which do naturally, at least initially, produce means for securing themselves but which can also be grown free of attachment. The mussels provide the means of securing the other shellfish to the cultivation support means. In this regard, mussels naturally secrete byssus, a mass of strong threads used by mussels for attaching themselves to a support surface. In addition to binding each mussel to the culture rope the secreted byssus also binds to the shellfish adjacent the mussel, thus providing the means for securing the other shellfish to the cultivation support means. It will be appreciated that the present invention provides significant advantages over the methods of the prior art in terms of both cost and simplicity.

BRIEF DESCRIPTION OF DRAWING

A preferred embodiment of the invention will now be described with reference to the accompanying drawing, which shows a seeding machine when in use in the preparation of shellfish in accordance with the invention.

BEST MODES FOR CARRYING OUT THE INVENTION

Figure 1:
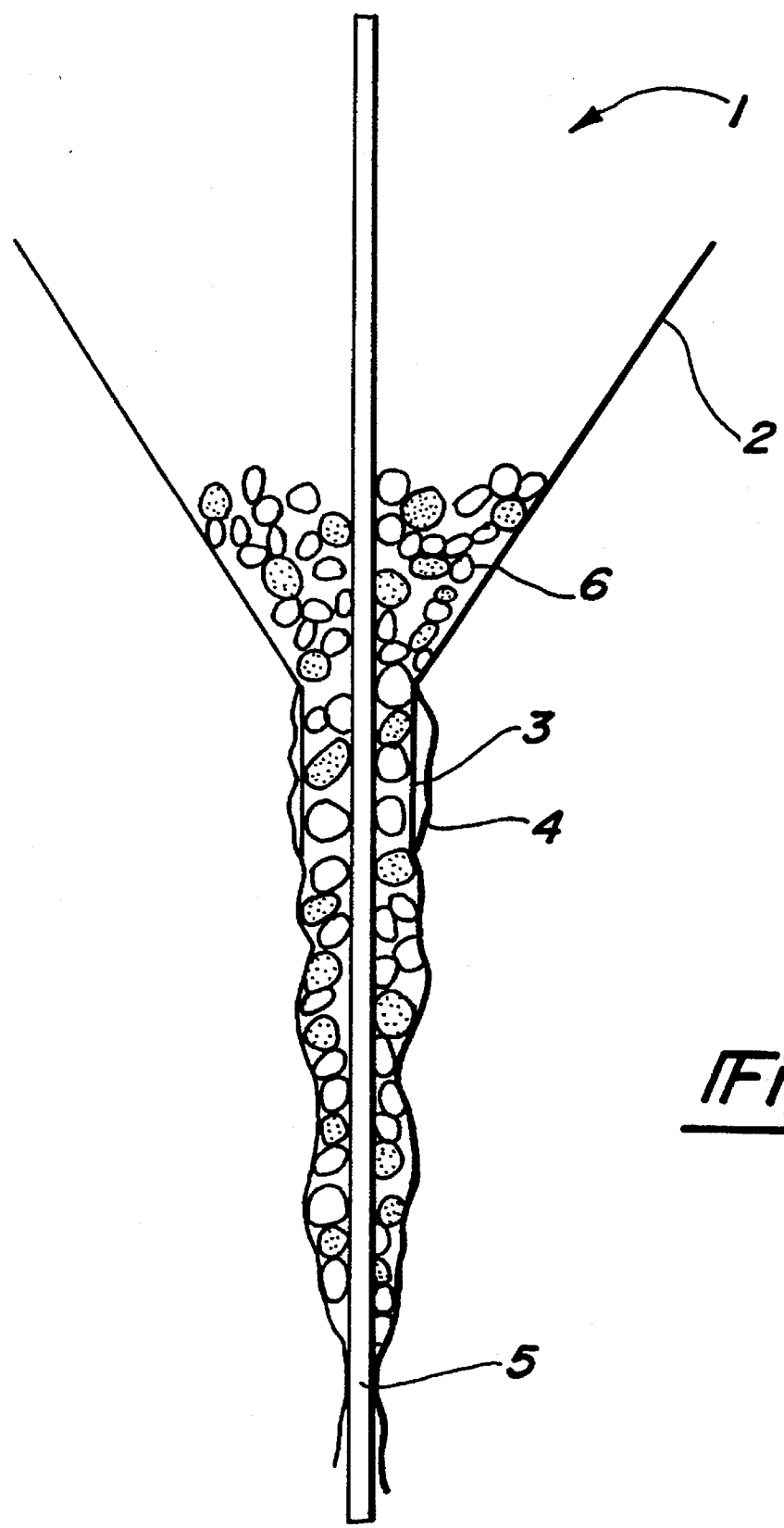

As illustrated in the drawing, a seeding machine 1 comprises a hopper 2 having a base which is substantially funnel shaped and which narrows down to an exit region terminating in a seeding tube 3. In preparation for operation of the seeding machine 1 a mesh-like seeding stocking 4 is stretched over and gathered about the seeding tube 3.

To produce a seeded rope ready for stringing out in a shellfish farm an end of a culture rope 5 is inserted into the hopper 2 and passed through the seeding tube 3. An end of the seeding stocking 4 is then closed around the rope 5.

A volume of live juvenile mussels and scallops are obtained, preferably in a ratio of at least three mussels per scallop, and are combined in such a manner that the juvenile scallops are substantially evenly dispersed within the mass of juvenile mussels. This substantially mixture of shellfish 6 is placed in the hopper 2. The shellfish 6 pass from the hopper 2 down the seeding tube 3 and surround the culture rope 5. The culture rope 5 is gradually pulled through the hopper 2 and seeding tube 3, dragging with it the seeding stocking 4. The shellfish 6 fall down through the seeding tube 3 into the seeding stocking 4 to surround the culture rope 5, the seeding stocking 4 retaining the shellfish 6 against the culture rope 5.

When the desired length of the culture rope 5 has been seeded with shellfish 6 the seeding stocking 4 is tied off and the remaining length of culture rope 5 removed from the seeding machine 1. The seeding stocking 4 should be maintained in a tensioned condition during the seeding operation otherwise clumps of shellfish occur.

Apparatus used to perform the seeding method of the present invention may be substantially similar to that used for seeding mussels alone although minor adaptions may be required. For example, particular control must be exercised over the mixing of the shellfish, therefore a further feed system or manual placement for the second shellfish type may be required.

As indicated above an even distribution of the shellfish is desirable. The reason for this is that better production yields are obtained. If the shellfish are not combined before being introduced into the seeding machine 1 a two belt feed system may be used to deliver the shellfish to the seeding tube 3. Alternatively, if the seeding machine 1 forms part of a small scale operation comprising in the main a seeding table the two types of shellfish may be placed by hand, e.g. mussels by the left hand and scallops by the right hand.

Each seeded rope can then be hung out on conventional long line rafts or other similar structures in a suitable environment for the shellfish to grow to a harvestable size. During the growth period, which can be between ten and twentyfour months, the seeding stocking 4 is burst by the growing shellfish or gradually degrades and disintegrates. During this time the mussels secrete byssus to secure themselves in place. During this process it has been found that the mussels bond both themselves and the scallops to the culture rope 5. Typically, the seeding stocking 4 is made from cotton or polyester/cotton mix, however, it will be appreciated that any other suitable material which either degrades fully, or at least sufficiently to allow the growing shellfish to burst through may be used. Other means for retaining the shellfish about the culture rope while the mussels secretes sufficient byssus to bind themselves and the scallops to the rope include "Spanish Lace", i.e. a strip of woven material such as cotton, rayon, polyester, nylon or mixes of these.

A suitable rope 5 would be between 10–15 mm diameter having a trim or fluffy medium on its surface so that the mussels can grip securely. Other acceptable rope types include plain black rope having a soft, medium or hard surface layer, and knitted rope.

As mentioned above, it has been found that in the case of scallops it is sufficient to use as little as three mussels per scallop. It will be appreciated that the above method is also applicable to other kinds of shellfish, and that the required number of mussels to bind the particular desired shellfish will depend on the size and shape of the shellfish in question. Other factors of influence will be the time of year, water temperature, location—i.e. rough or smooth water in the cultivation area, tidal currents, and the particular species of mussel used to provide the attachment medium.

Although the above described embodiment uses a culture rope 5 to provide the cultivation support means it will be appreciated that lengths of tarred stick, bamboo poles, palm stakes, rows of poles (bouchots), cut down trawl netting, trim from polypropylene sacks, or any other such durable support material may be used in its place.

Shellfish such as juvenile oysters (spat) which do not have the potential to produce byssus or an equivalent securement means are often able to temporarily attach themselves to a culture rope by way of their cement gland. Attachment to a culture rope in this manner is not reliable as the oysters may leave the rope at any time. In calm water conditions it is possible for an oyster to remain attached by way of its cement gland for up to two years, however the attachment does not provide a reliable way of retaining oysters while they develop.

In a further embodiment of the invention a culture rope is placed in a suitable location such that non-byssus producing juvenile oysters attach themselves to the rope by way of the cement glands. The non-byssus producing shellfish could be sourced from a hatchery or could be obtained naturally or artificially from the wild. The culture rope is then seeded with byssus producing shellfish such as mussels using a seeding machine as described previously. The mussels are thus seeded onto the culture rope over the juvenile oysters and both are retained in position by a seeding stocking as also described previously. The seeded culture rope is then placed in a suitable cultivation area while the juvenile oysters and mussels develop. As the mussels develop they produce byssus and thereby secure themselves to the culture rope. The oysters are also secured by the byssus which is produced by the mussels. The mussels and the oysters are thus able to remain associated with the culture rope without the seeding stocking. The seeding stocking then degrades or is burst such that it is at least substantially wasted at the time of harvest.

It should be appreciated that this further embodiment of the invention is not limited to use with only mussels and oysters. For example, the mussels can be substituted by any shellfish capable of producing a securement means similar to byssus. Similarly, juvenile scallops may be used in preference to the juvenile oysters.

Examples of shellfish which are able to temporarily attach themselves to a culture rope include rock oysters such as *Crassostrea gigas, Crassostrea virginica* and *Crassostrea commercialis*. Further examples include flat or dredge oysters such as Tiostrea lutaria (also called *Tiostrea chilensis*), ostrea angasi and austrea edulis.

Additional advantages of the present invention will become apparent to those skilled in the art after considering the principles in particular form as discussed and illustrated.

Accordingly, it will be appreciated that changes may be made to the above described embodiment of the invention without departing from the principles taught herein.

Finally, it will be understood that this invention is not limited to the particular embodiments described or indicated but is intended to cover all alterations, additions, or modifications which are within the scope of the appended claims.

We claim:

1. A method of cultivating shellfish, wherein the improvement comprises retaining a plurality of live juvenile shellfish on a cultivation support means by way of a retaining means, said plurality of shellfish comprising a first type of shellfish having the potential for producing securement means at a future date such that said first type of shellfish can become secured to said support means by said securement means, said plurality of shellfish also comprising a second type of shellfish not having the potential for producing securement means, wherein said second type of shellfish can become secured to said support means by way of said securement means when said securement means has been produced by said first type of shellfish.

2. A method according to claim 1, wherein said plurality of shellfish are placed in a suitable cultivation medium after said plurality of shellfish have been retained on said support means by said retaining means, and said plurality of shellfish are allowed to grow such that securement means is produced by said first type of shellfish wherein the securement means secures said first type of shellfish to said support means.

3. A method according to claim 2, wherein said securement means acts to secure said second type of shellfish directly to said support means.

4. A method according to claim 2, wherein said second type of shellfish comprises oysters.

5. A method according to claim 2, wherein said second type of shellfish comprises scallops.

6. The method according to claim 2 wherein said securement means acts to secure the second type of shellfish directly to said first type of shellfish.

7. A method according to claim 1, wherein said retaining means is allowed to become at least substantially wasted after said second type of shellfish becomes secured to said support means.

8. A method according to claim 1, wherein said support means is a length of culture rope.

9. A method according to claim 1, wherein said retaining means is a tubular mesh material.

10. A method according to claim 1, wherein said first type of shellfish comprises mussels.

11. A method according to claim 1, wherein said second type of shellfish is allowed to become attached to the support means before the plurality of shellfish are retained on the support means by way of the retaining means.

12. A method according to claim 1, wherein the step of retaining the plurality of shellfish on the support means by way of the retaining means involves seeding the plurality of shellfish on the support means.

* * * * *

UNITED STATES PATENT AND TRADEMARK OFFICE
CERTIFICATE OF CORRECTION

PATENT NO. : 5,511,514
DATED : April 30, 1996
INVENTOR(S) : Michael W. Hitchins, Hamish T. Jamieson and Bruce J. Hern It is certified that error appears in the above-indentified patent and that said Letters Patent is hereby corrected as shown below:

Abstract, line 2, "cultch" should be -- culture --.

Signed and Sealed this

Nineteenth Day of November, 1996

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,511,514
DATED : April 30, 1996
INVENTOR(S) : Michael W. Hitchins, et al It is certified that error appears in the above-indentified patent and that said Letters Patent is hereby corrected as shown below:

On title page, item [73] Assignee, the following Assignee should be listed:

--Pernaful Holdings Limited
Blenheim, New Zealand--

Signed and Sealed this

Thirty-first Day of December, 1996

*Attest:*

BRUCE LEHMAN

*Attesting Officer*     *Commissioner of Patents and Trademarks*